United States Patent
Lin et al.

(10) Patent No.: US 7,755,976 B2
(45) Date of Patent: Jul. 13, 2010

(54) TIME CONTROL SYSTEM AND METHOD FOR PROJECTOR

(75) Inventors: Wei Lin, Taipei Hsien (TW); Ming-Li Lin, Taipei Hsien (TW); Yuan-Yuan Lin, Taipei Hsien (TW); Huei-Shiang Chien, Taipei Hsien (TW)

(73) Assignee: Acer Incorporated, Taipei Hsien, Taipei ( * ) Notice: Subject to any disclaimer, the term of this patent is extended or adjusted under 35 U.S.C. 154(b) by 157 days.

(21) Appl. No.: 11/539,308

(22) Filed: Oct. 6, 2006

(65) Prior Publication Data

US 2008/0084791 A1 Apr. 10, 2008

(30) Foreign Application Priority Data

Oct. 7, 2005 (TW) .............................. 94135269 A

(51) Int. Cl.
*G04F 10/00* (2006.01)
*G04B 23/02* (2006.01)
(52) U.S. Cl. ...................... 368/109; 368/245; 353/40; 353/122
(58) Field of Classification Search ............... 368/89, 368/109, 107–108, 244–245
See application file for complete search history.

(56) References Cited

U.S. PATENT DOCUMENTS

| 4,196,582 | A  | * | 4/1980 | Hersberger et al. | 368/70 |
| 5,050,141 | A  | * | 9/1991 | Thinesen | 368/73 |
| 6,194,994 | B1 | * | 2/2001 | Curran et al. | 340/293 |
| 6,212,135 | B1 | * | 4/2001 | Schreiber | 368/107 |
| 6,236,622 | B1 | * | 5/2001 | Blackman | 368/10 |
| 6,575,895 | B1 | * | 6/2003 | Blair | 600/27 |
| 6,798,720 | B2 | * | 9/2004 | Haupt et al. | 368/79 |
| 7,149,152 | B1 | * | 12/2006 | Chan | 368/79 |
| 7,379,393 | B2 | * | 5/2008 | Morykwas et al. | 368/10 |
| 2003/0142591 | A1 | * | 7/2003 | Baweja et al. | 368/263 |
| 2004/0066709 | A1 | * | 4/2004 | Morykwas et al. | 368/10 |
| 2005/0174889 | A1 | * | 8/2005 | Marcantonio et al. | 368/12 |

* cited by examiner

*Primary Examiner*—Vit W Miska
*Assistant Examiner*—Sean Kayes
(74) *Attorney, Agent, or Firm*—WPAT, P.C.; Anthony King

(57) ABSTRACT

A time control system and a method for a projector. The time control system comprises an input module, a processor, a timer, and at least one output module. The input module is used to input at least one time parameter that is set by the processor into the timer. The timer is used to generate at least one trigger signal by counting the at least one time parameter. Meanwhile, the output module is used to output a reminder signal relating to the at least one trigger signal. The time control system is applied for reminding users.

8 Claims, 10 Drawing Sheets

| | |
|---|---|
| Time Setting | 50 ⇕ Minutes |
| Reminder Frequency | 3 ⇕ Times |
| Reminder Mode | oVideo/oAudio/⊙Both |
| Counting Setting | oForward/⊙Backward |
| Display Position | |
| oUpper-Left/oBottom-Left/⊙Upper-Right/oBottom-Right | |
| Reminder Time Point | 2 ⇕ Minutes Reminder Intensity 2 ⇕ |
| Reminder Time Point | 1 ⇕ Minutes Reminder Intensity 5 ⇕ |

Fig. 4

| | |
|---|---|
| Time Setting | 50 ⇕ Minutes |
| Reminder Frequency | 3 ⇕ Times |
| Reminder Mode | oVideo/oAudio/⊙Both |
| Counting Setting | oForward/⊙Backward |
| Display Position | | oUpper-Left/oBottom-Left/⊙Upper-Right/oBottom-Right

Reminder Time Point 2 ⇕ Minutes Reminder Intensity 2 ⇕

Reminder Time Point 1 ⇕ Minutes Reminder Intensity 5 ⇕

Fig. 8

TIME CONTROL SYSTEM AND METHOD FOR PROJECTOR

FIELD OF THE INVENTION

The present invention relates to a time control system and a method for a projector and, more particularly, to utilize a reminder signal to control the presentation time.

BACKGROUND OF THE INVENTION

The quality of the presentation equipment has substantially improved. The projectors in meetings play a decisive role. General speaking, signals outputted by a computer are utilized to be the signal source of projectors. People who would like to present their presentations in a meeting use a computer system (e.g. desktops or laptops) to output video data to a projector sequentially and the video data then are projected by the projector on a screen. Therefore, the fluency of presentation process depends on projectors with good functionality The efficiency of the presentation can be improved by operating some specific functions. For example, users often forget to control time during the presentation. To improve aforesaid defects, a bell is used to remind the users to control time. However, the bell may embarrass among users, audiences, and organizers.

To overcome the foregoing shortcomings, the inventor based on years of experience on related research and development invents a time control system and a method for a projector in hope of overcoming the foregoing problem.

SUMMARY OF THE INVENTION

Briefly, a primary object of the present invention is to provide a time control system and a method for a projector. More specifically, a reminder signal is used to achieve the goal of controlling the presentation time.

To achieve the foregoing object, the time control system comprises an input module, a processor, a timer, and at least one output module. The input module is for inputting at least one time parameter. The at least one time parameter then is set by the processor into the timer. At least one trigger signal is generated by the timer relating to the at least one time parameter. Meanwhile, the at least one trigger signal is transmitted by the processor to the at least one output module for outputting a reminder signal.

A second object of the present invention is to provide time control methods through the time control system for a projector. One time control method is that an input screen is displayed by the projector when a keypad module is implemented. At least one time parameter then is inputted by the keypad module. The at least one time parameter is set by the processor into the timer. At least one trigger signal is generated by the timer relating to the at least one time parameter. Lastly, the at least one trigger signal is transmitted by the processor to the at least one output module for outputting a reminder signal. Another timer control method is that an electronic apparatus with a time control interface is provided to connect with the projector. At least one time parameter is inputted through the time control interface, and the at least time parameter is set by the processor into the timer. At least one trigger signal is generated by the timer relating to the at least one time parameter. Lastly, the at least one trigger signal is transmitted by the processor to the at least one output module for outputting a reminder signal.

Accordingly, the time control system of the present invention utilizes a reminder signal to achieve the time control when a user uses a projector to presents his presentation.

Other features and advantages of the present invention and variations thereof will become apparent from the following description, drawings, and claims.

BRIEF DESCRIPTION OF THE DRAWINGS

FIG. 4 is a schematic diagram illustrating an input screen according to an embodiment of the present invention;

FIG. 8 is a schematic diagram illustrating the time control interface according to an embodiment of the present invention;

DETAILED DESCRIPTION OF THE PREFERRED EMBODIMENTS

Figure 1:
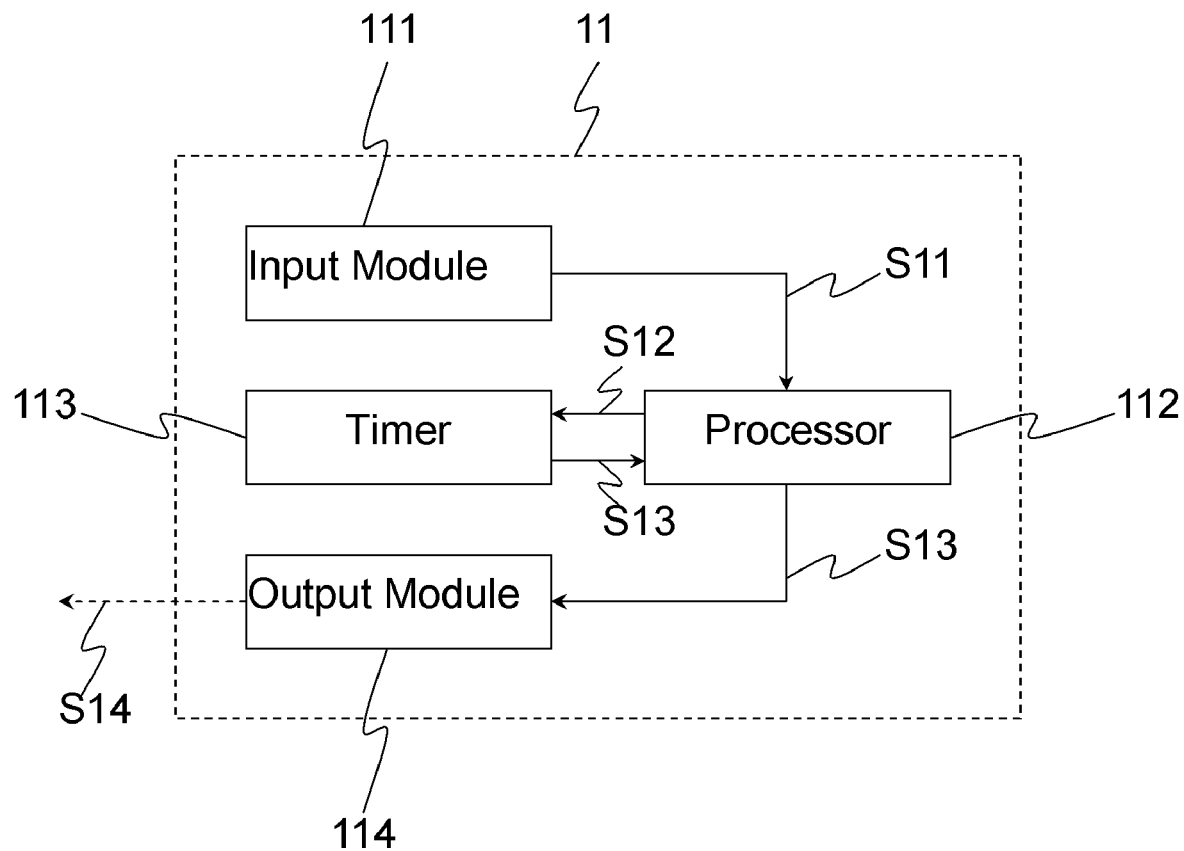
FIG. 1 is a schematic diagram illustrating a time control system according to an embodiment of the present invention.

Referring to the related figures for the time control system and method for projector according to a preferred embodiment of the present invention, wherein the same elements are described by the same reference numerals.

Referring to FIG. 1, a schematic diagram illustrates a time control system according to an embodiment of the present invention. The time control system 11 is applied for a projector. The time control system 11 comprises an input module 111, a processor 112, a timer 113 and at least one output module 114. The input module 111 is connected with the processor 113 for inputting at least one time parameter s11. The processor 112 (e.g. microprocessor) is used to receive the at least one time parameter from the input module 111 in order to implement a setting action s12. The timer 113 is connected with the processor 112, and the setting action s12 of the at least one time parameter is implemented by the processor 112. At least one trigger signal s13 is generated by the timer 113 based on the at least one time parameter. The at least one output module 114 is connected with the processor 112. Lastly, the at least one trigger signal s13 is transmitted by the processor 112 in order to output a reminder signal s14.

Figure 2:
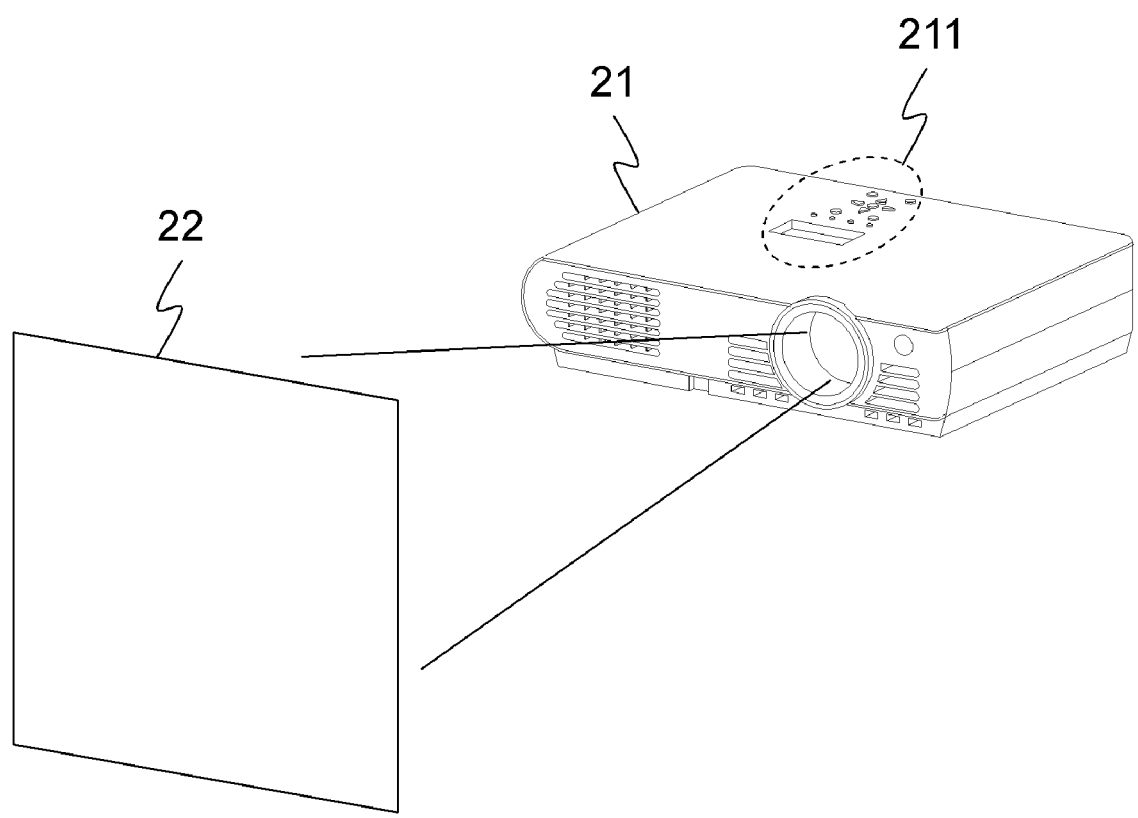
FIG. 2 is a perspective drawing illustrating the time control system according to an embodiment of the present invention.

Referring to FIG. 2, a perspective drawing illustrates the time control system according to an embodiment of the present invention. As shown in FIG. 2, the time control system comprises a projector 21 and a plane 22. A keypad module 211 is disposed on the projector 21. The keypad module 211 is taken to be an input module. While operating the keypad module 211, an input screen of the time control system is projected by the projector 21 on the plane 22 so that the at least one time parameter can be inputted by the keypad module 211.

Figure 3:
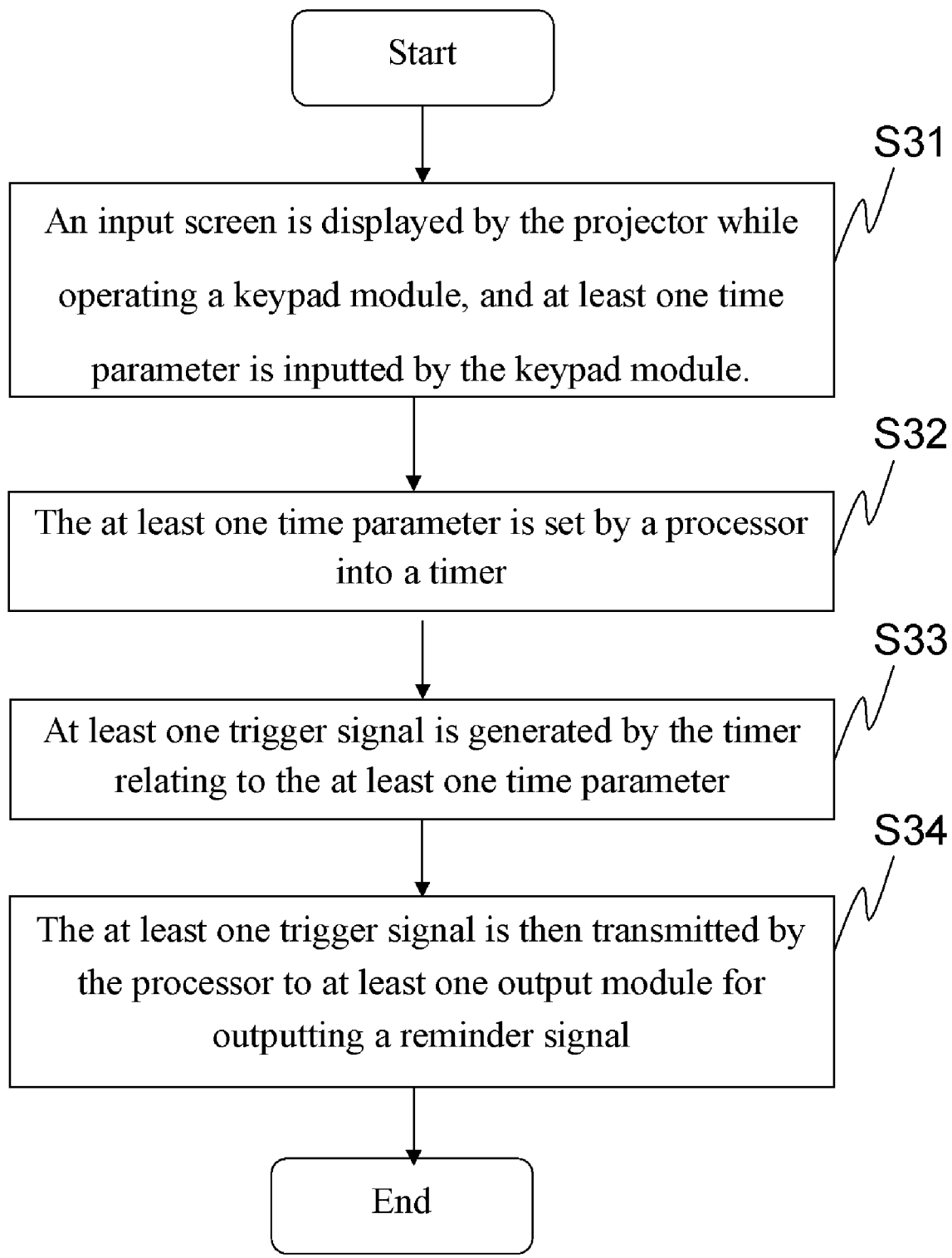
FIG. 3 is a flowchart illustrating a time control method according to an embodiment of the present invention.

Referring to FIG. 3, a flowchart illustrates a time control method according to an embodiment of the present invention. The time control method is applied for a projector, and comprises the following steps:

Step S31: an input screen is displayed by the projector while operating a keypad module, and at least one time parameter is inputted by the keypad module.

Step S32: the at least one time parameter is set by a processor into a timer.

Step S33: at least one trigger signal is generated by the timer relating to the at least one time parameter.

Step S34: the at least one trigger signal is transmitted by the processor to at least one output module for outputting a reminder signal.

Referring to FIG. 4, a schematic diagram illustrates an input screen according to an embodiment of the present invention. The selections of the input screen comprises time setting with a period, a reminder frequency, a reminder mode, a counting setting, a display position, at least one reminder time point, a reminder intensity, and a circle frequency The time setting is set by minute. The reminder mode is separated into a video mode, an audio mode or both video and audio mode. Moreover, the counting setting is divided into forward counting and backward counting. Meanwhile, the display position of an on-screen display is set at an upper-left, a bottom-left, an upper-right or a bottom-right. The reminder time point is set by minute for the basic unit. Therefore, the timer is used to count relating to the at least one time parameter. For example, the time setting for a reminder setting as shown in FIG. 4 is set to be fifty minutes, and the reminder frequency is set to be three times. The both video and audio mode is selected for the reminder mode. The counting setting is backward counting. The upper-right is selected for the display position. The reminder time point is set to be two-minute, one-minute, and zero-minute respectively. The reminder intensity is set to be two, five, and nine. The circle frequency is set to be zero. The reminder intensity for the video and the audio will be presented at different rates relating to intensity levels. Therefore, a slower flickering for the flicker mode of the video reminder signal is displayed for reminding the user when the time is counted up to forty-eight minutes. When the time then is counted up to forty-nine minutes, a faster flickering for the video reminder signal and a "beep" sound of the audio reminder signal are displayed for reminding the user. When the time is counted up to fifty minutes, a fastest flickering for the video reminder signal and "beep-beep-beep" sounds for the audio reminder signal are utilized for reminding the user.

Figure 5:
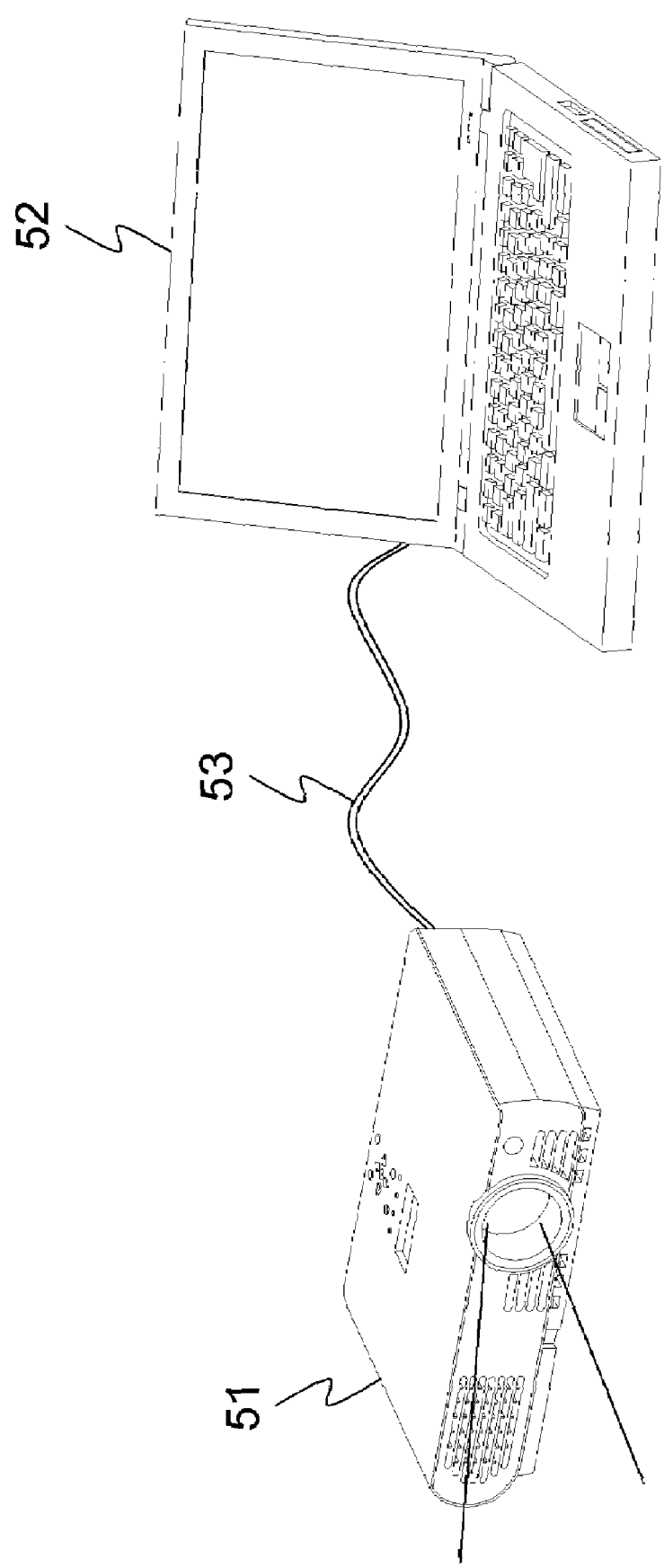
FIG. 5 is a perspective drawing illustrating the time control system according to another embodiment of the present invention.
Figure 6:
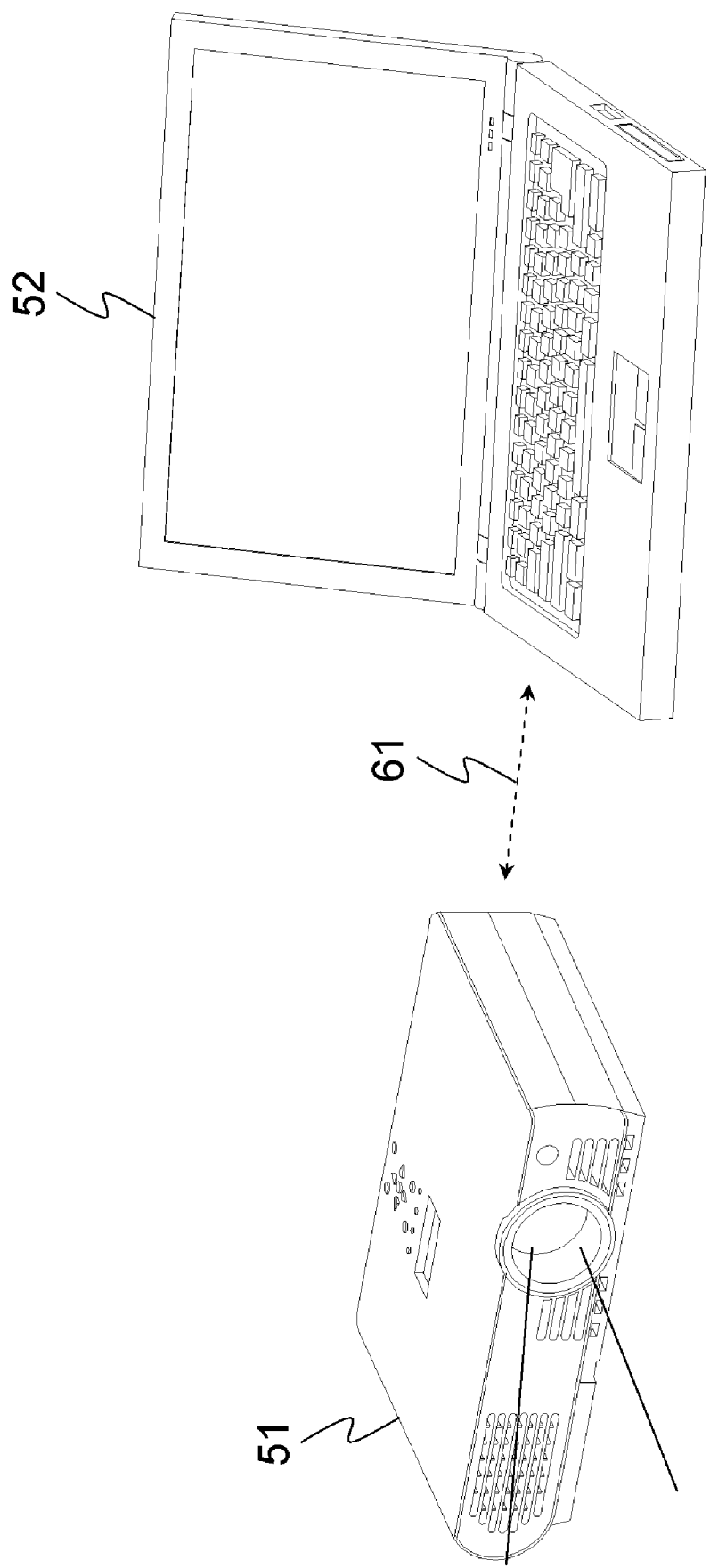
FIG. 6 is a perspective drawing illustrating the time control system according to further embodiment of the present invention.

FIG. 5 is a perspective drawing illustrating the time control system according to another embodiment of the present invention. FIG. 6 is a perspective drawing illustrating the time control system according to a further embodiment of the present invention. Referring to FIG. 5 and FIG. 6, as shown in FIG. 5, the time control system comprises a projector 51 and an electronic apparatus 52. The projector 51 is connected with the electronic apparatus 52 through a transmission wire 53. At least one time parameter is set by a time control interface of the electronic apparatus 52 to control the time control system. As shown in FIG. 6, the time control system comprises the projector 51 and the electronic apparatus 52. The projector 51 is connected with the electronic apparatus 52 through a wireless communication protocol 61. At least one time parameter is set by a time control interface of the electronic apparatus 52 to control the time control system. In addition, the electronic apparatus 52 is preferably a desktop, a laptop, a personal digital assistant or other portable electronic apparatuses. The time control interface is a program which is set into the electronic apparatus 52. The time control interface includes a scheduler that provides many people to set time parameters. Alternatively, when time parameters are set by the time control interface, the time control interface does not need to be projected on the plane through the projector 51 so as to make smoother and more comfortable meeting experiences between users and audiences.

Figure 7:
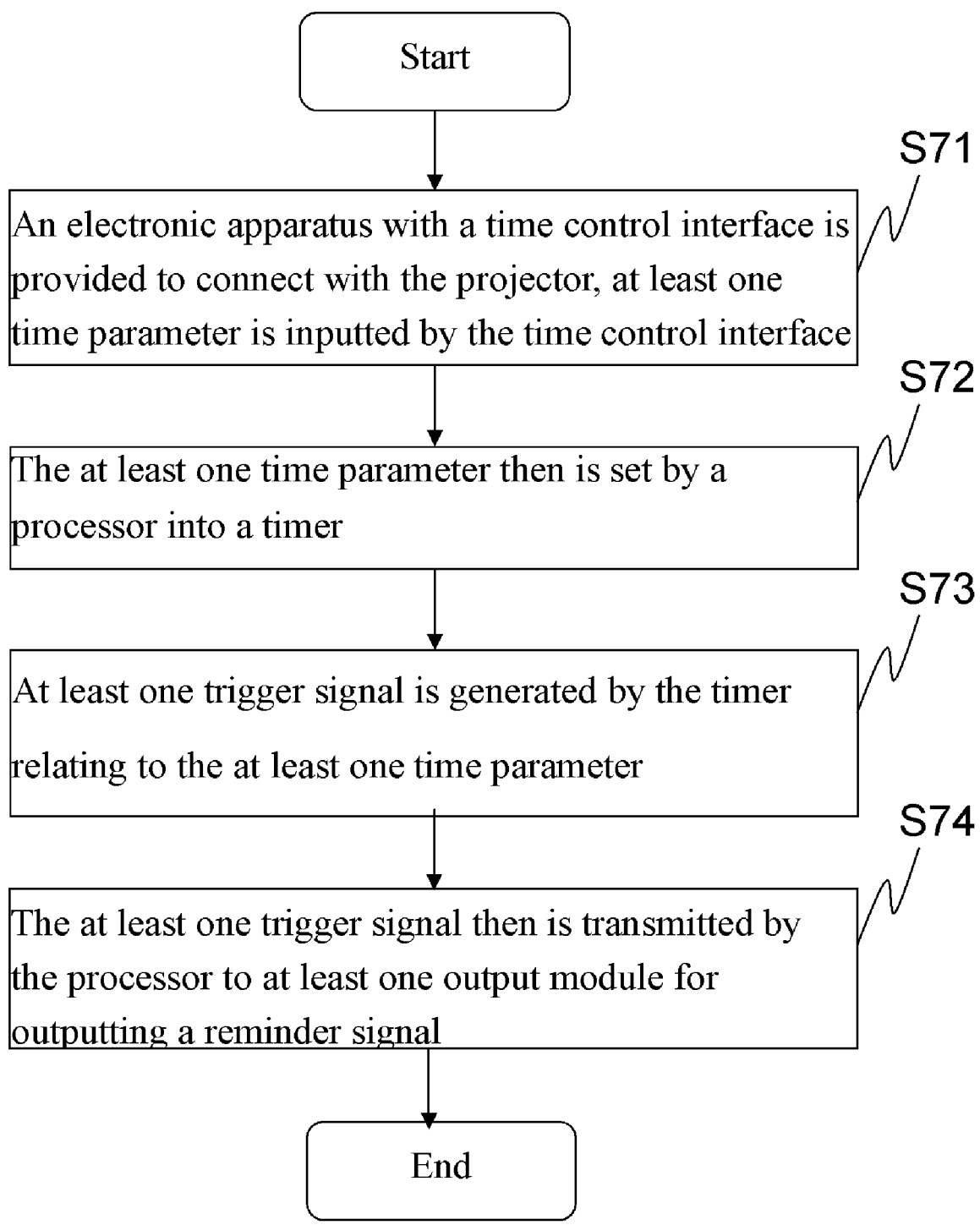
FIG. 7 is another flowchart illustrating the time control method according to another embodiment of the present invention.

Referring to FIG. 7, another flowchart illustrates the time control method according to another embodiment of the present invention. The time control method is applied for the projector, and comprises the following steps:

Step S71: an electronic apparatus with a time control interface is provided to connect with the projector, and at least one time parameter is inputted by the time control interface.

Step S72: the at least one time parameter then is set by a processor into a timer.

Step S73: at least one trigger signal is generated by the timer relating to the at least one time parameter.

Step S74: the at least one trigger signal then is transmitted by the processor to at least one output module for outputting a reminder signal.

Referring to FIG. 8, a schematic diagram illustrates the time control interface according to an embodiment of the present invention. The items of an input screen comprise time setting with a period, a reminder frequency, a reminder mode, a counting setting, a display position, at least one reminder time point, a reminder intensity, and a circle frequency The time setting is set by minute, and the reminder mode is separated into a video mode, an audio mode or both video and audio mode. Moreover, the counting setting is divided into forward counting and backward counting. Meanwhile, the display position of an on-screen display is set at an upper-left, a bottom-left, an upper-right or a bottom-right. The reminder time point is set by minute for the basic unit. Therefore, the timer is used to count relating to the at least one time parameter. For example, the time setting for a reminder setting as shown in FIG. 8 is set to be fifty minutes, and the reminder frequency is set to be three times. The both video and audio mode is selected for the reminder mode. The counting setting is backward counting. The upper-right is selected for the display position. The reminder time point is set to be two-minute, one-minute, and zero-minute respectively. The reminder intensity is set to be two, five, and nine. The circle frequency is set to be zero. The reminder intensity for the video and the audio will be presented at different rates relating to an intensity level. Therefore, for example of time parameter setting, a slower flickering for the flicker mode of the video reminder signal is displayed for reminding the user when the time is counted up to forty-eight minutes. When the time then is counted up to forty-nine minutes, a faster flickering for the video reminder signal and a "beep" sound of the audio reminder signal are displayed for reminding the user. When the time is counted up to fifty minutes, a fastest flickering for the video reminder signal and "beep-beep-beep" sounds for the audio reminder signal are utilized for reminding the user.

Figure 9:
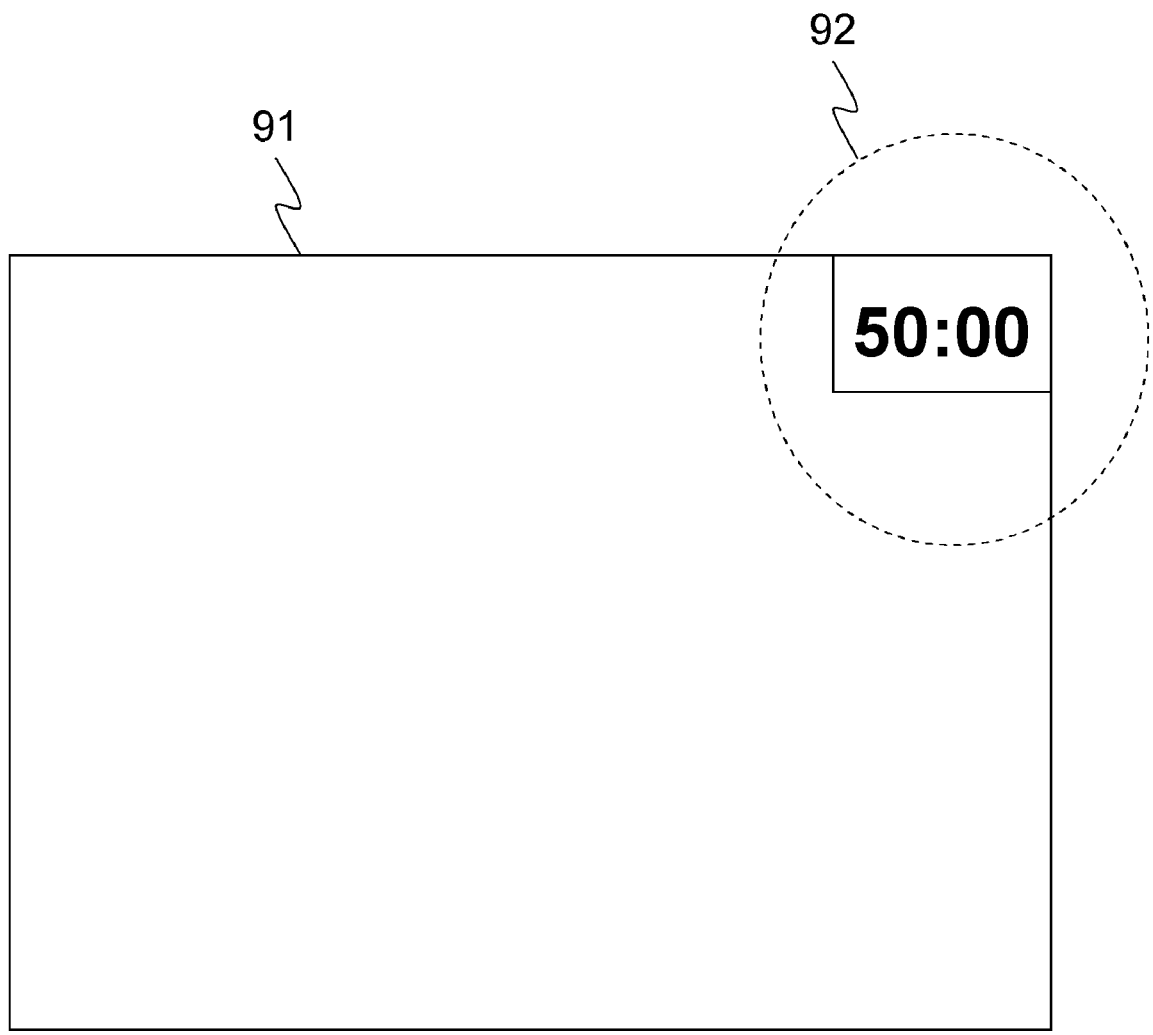
FIG. 9 is a schematic diagram illustrating the reminder signal according to an embodiment of the present invention.

Referring to FIG. 9, a schematic diagram illustrates the reminder signal according to an embodiment of the present invention. The reminder signal displayed on a plane 91 is a video reminder signal 92. The video reminder signal 92 is projected by a video output module of the projector to form the on-screen display that is displayed on the plane 91 in order to remind a user. The video reminder signal 92 is displayed by a flicker mode that utilizes one light, one dark or various color changes or other ways for flickering.

Figure 10:
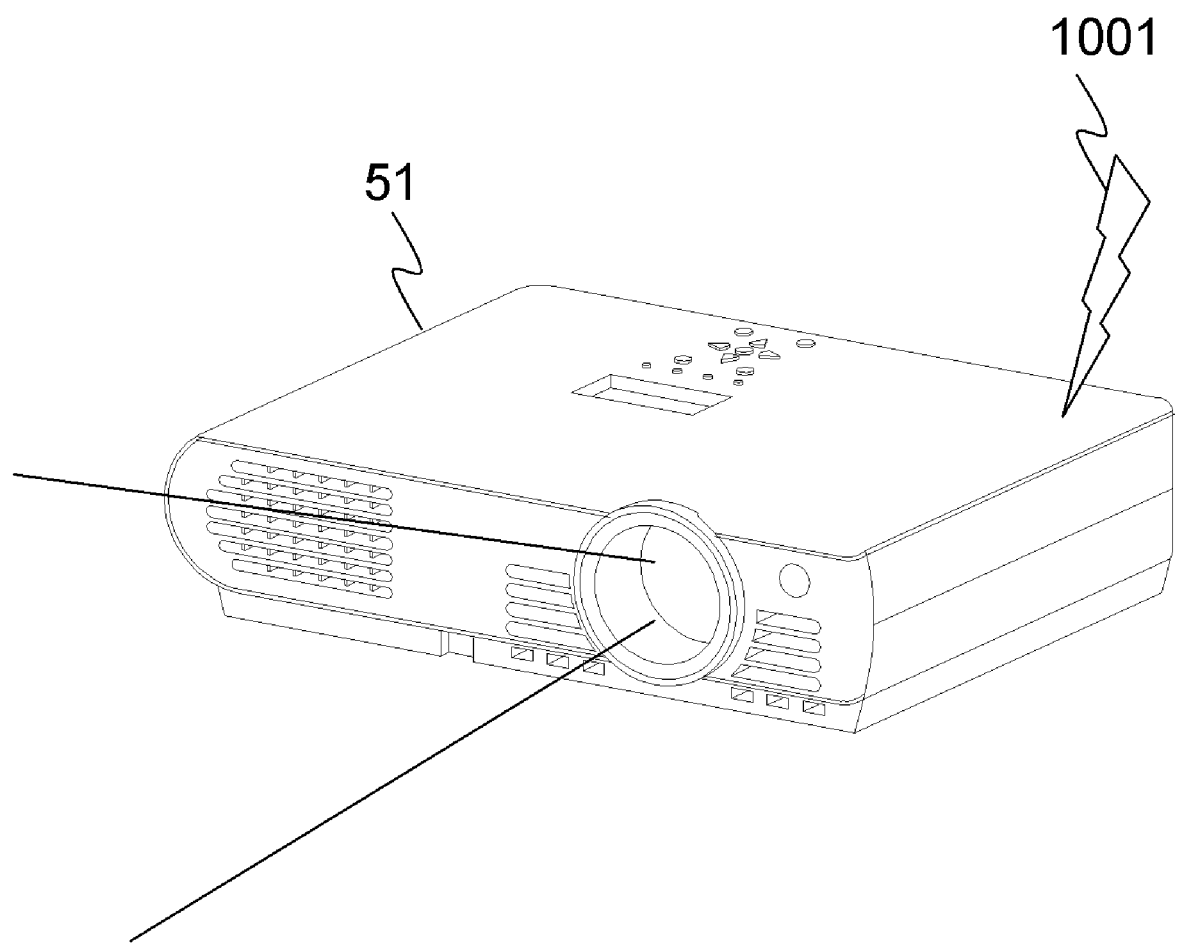
FIG. 10 is a schematic diagram illustrating the reminder signal according to another embodiment of the present invention.

Referring to FIG. 10, a schematic diagram illustrates the reminder signal according to another embodiment of the present invention. The reminder signal generated by the projector 51 is an audio reminder signal 1001. The audio reminder signal 1001 is sent by an audio output module of the projector 51 relating to at least one set time parameter, such as "Bi" or "Bi-Bi-Bi" sound. Alternatively, the audio reminder signal 1001 can be formed by other long/short sounds or combinations.

Although the features and advantages of the embodiments according to the preferred invention are disclosed, it is not limited to the embodiments described above, but encompasses any and all modifications and changes within the spirit and scope of the following claims.

What is claimed is:

1. A time control system for use in a projector, comprising:
    an input module to input at least one time parameter, wherein said one time parameter includes a reminder strength setting to set a user-discernable frequency of a user-discernable reminder signal;
    a processor for receiving said at least one time parameter to implement a setting action;
    a timer for implementing said setting action of said at least one time parameter through said processor, and for generating at least one trigger signal relating to said at least one time parameter; and
    at least one output module for outputting a reminder signal relating to said at least one trigger signal transmitted by said processor;
    wherein said at least one time parameter further comprises a timing period setting, a counting setting, or a display position setting; and said reminder strength setting sets an intensity of a flickering of a visual display of said reminder signal, and wherein said reminder strength setting sets an intensity of an audio representation of said reminder signal, wherein the intensity of the flickering is defined as a user-discernable frequency of a user-discernable blinking of the visual display; and wherein the intensity of the audio representation is defined as a user-discernable sound-pause frequency of the audio representation.

2. The time control system of claim 1, wherein said input module is a keypad module, and said keypad module is disposed on said projector.

3. The time control system of claim 1, wherein said input module is a keypad module, and said keypad module is disposed on a remote controller by utilizing a wireless mode to transmit data to said projector.

4. The time control system of claim 1, wherein said input module is a time control interface, and said time control interface is disposed in an electronic apparatus by utilizing a transmission wire or a wireless communication protocol to connect with said projector.

5. A time control method for use in a projector, comprising:
    displaying an input screen through said projector while operating a keypad module, and inputting at least one time parameter by said keypad module;
    providing at least one time parameter selected from a timing period setting, a counting setting, and a display position setting;
    setting said at least one time parameter through a processor into a timer, wherein said at least one time parameter includes a reminder strength setting to set a user-discernable frequency of a user-discernable reminder signal;
    generating at least one trigger signal from said timer relating to said at least one time parameter; and
    transmitting said at least one trigger signal through said processor to at least one output module for outputting a reminder signal;
    wherein said reminder strength setting sets an intensity of a flickering of a visual display of said reminder signal, and wherein said reminder strength setting sets an intensity of an audio representation of said reminder signal, wherein the intensity of the flickering is defined as a user-discernable frequency of a user-discernable blinking of the visual display; and wherein the intensity of the audio representation is defined as a user-discernable sound-pause frequency of the audio representation.

6. The time control method of claim 5, further comprising the step of providing a video reminder signal or an audio reminder signal to be said reminder signal.

7. A time control method for use in a projector, comprising:
    providing an electronic apparatus having a time control interface to connect with said projector, inputting at least one time parameter by said time control interface;
    providing a timing period setting, a counting setting, or a display position setting related to the at least one time parameter;
    setting the at least one time parameter through a processor into a timer, wherein the at least one time parameter includes a reminder strength setting to set a user-discernable frequency of a user-discernable reminder signal;
    setting an intensity of a flickering of a visual display of a reminder signal by said reminder strength setting;
    setting an intensity of an audio representation of said reminder signal by said reminder strength setting;
    generating at least one trigger signal from said timer relating to said at least one time parameter; and
    transmitting said at least one trigger signal through said processor to at least one output module for outputting said reminder signal;
    wherein the intensity of the flickering is defined as the user-discernable blinking frequency of a user-discernable blinking of the visual display; and wherein the intensity of the audio representation is defined as a user-discernable sound-pause frequency of the audio representation.

8. The time control method of claim 7, further comprising the step of providing a scheduler to be said time control interface.

* * * * *